(12) United States Patent
Wilson

(10) Patent No.: US 10,947,840 B2
(45) Date of Patent: Mar. 16, 2021

(54) OFFSHORE DOWNHOLE TELEMETRY USING SEA FLOOR CABLE

(71) Applicant: Halliburton Energy Services, Inc., Houston, TX (US)

(72) Inventor: Glenn Andrew Wilson, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/629,221

(22) PCT Filed: Nov. 8, 2017

(86) PCT No.: PCT/US2017/060512
§ 371 (c)(1),
(2) Date: Jan. 7, 2020

(87) PCT Pub. No.: WO2019/093999
PCT Pub. Date: May 16, 2019

(65) Prior Publication Data
US 2020/0270988 A1    Aug. 27, 2020

(51) Int. Cl.
*E21B 47/13*     (2012.01)
*H04Q 9/00*      (2006.01)
*E21B 41/00*     (2006.01)
*E21B 47/00*     (2012.01)

(52) U.S. Cl.
CPC ............... *E21B 47/13* (2020.05); *H04Q 9/00* (2013.01); *E21B 41/0007* (2013.01); *E21B 47/00* (2013.01); *H04Q 2209/30* (2013.01); *H04Q 2209/40* (2013.01)

(58) Field of Classification Search
CPC ....... E21B 47/13; H04Q 9/00; H04Q 2209/40
See application file for complete search history.

(56) References Cited

U.S. PATENT DOCUMENTS 5,959,548 A * 9/1999 Smith ..................... E21B 47/13
340/854.8
6,018,501 A * 1/2000 Smith ..................... E21B 47/14
367/134

(Continued)

FOREIGN PATENT DOCUMENTS

WO    WO-2016085509 A1 *  6/2016  ............... G01V 3/12

OTHER PUBLICATIONS

Chen et al., "Long Range Electromagnetic Telemetry Using an Innovative Casing Antenna System," Society of Petroleum Engineers, SPE Annual Technical Conference and Exhibition, Sep. 28-30, 2015, Houston, Texas, USA.

(Continued)

*Primary Examiner* — Matthew R Buck
(74) *Attorney, Agent, or Firm* — Haynes and Boone, LLP

(57) ABSTRACT

An offshore measured or logging-while drilling electromagnetic telemetry system includes a bottomhole assembly having a transmitter to communicate one or more electromagnetic telemetry signals. A subsea telemetry cable is positioned on a sea floor to receive the telemetry signals. The subsea telemetry cable is coupled to an umbilical cable extending to a surface communication unit positioned at the sea surface. Signals received by the subsea telemetry cable are transmitted to the surface communication unit for further processing.

16 Claims, 4 Drawing Sheets

(56) References Cited

U.S. PATENT DOCUMENTS

| | | | | |
|---|---|---|---|---|
| 6,144,316 | A * | 11/2000 | Skinner | E21B 47/18 340/853.7 |
| 6,177,882 | B1 * | 1/2001 | Ringgenberg | E21B 47/13 340/853.7 |
| 7,109,717 | B2 * | 9/2006 | Constable | G01V 3/083 324/337 |
| 7,123,162 | B2 * | 10/2006 | Mackenzie | E21B 43/01 340/854.7 |
| 7,170,423 | B2 * | 1/2007 | Wisler | E21B 47/13 340/853.7 |
| 2007/0024464 | A1 | 2/2007 | Lemenager et al. | |
| 2010/0182161 | A1 * | 7/2010 | Robbins | E21B 47/14 340/853.7 |
| 2011/0074428 | A1 * | 3/2011 | Wang | G01V 3/30 324/339 |
| 2011/0187553 | A1 * | 8/2011 | Rodney | E21B 47/13 340/852 |
| 2012/0126992 | A1 | 5/2012 | Rodney et al. | |

OTHER PUBLICATIONS

International Search Report and the Written Opinion of the International Search Authority, or the Declaration, Jul. 20, 2018, PCT/US2017/060512, 11 pages, ISA/KR.

Park et al., "Planning and Implementation of the Repsol-YPF-MAXUS Krisna Underbalanced Drilling Project," *Society of Petroleum Engineers, SPE/IADC Drilling Conference*, Feb. 27-Mar. 1, 2001, Amsterdam, Netherlands.

Peter et al., "Innovative Technology Advances Use of Electromagnetic MWD Offshore in Southern North Sea," *Society of Petroleum Engineers, IADC/SPE Underbalanced Technology Conference and Exhibition*, Mar. 25-26, 2003, Houston, Texas, USA.

Weisbeck et al., "Case History of First Use of Extended-Range EM MWD in Offshore, Underbalanced Drilling," *Society of Petroleum Engineers, IADC/SPE Drilling Conference*, Feb. 26-28, 2002, Dallas, Texas, USA.

* cited by examiner

OFFSHORE DOWNHOLE TELEMETRY USING SEA FLOOR CABLE

PRIORITY

The present application is a U.S. National Stage patent application of International Patent Application No. PCT/US2017/060512, filed on Nov. 8, 2017, the benefit of which is claimed and the disclosure of which is incorporated herein by reference in its entirety.

FIELD OF THE DISCLOSURE

The present disclosure relates generally to subsea data communication systems and, more specifically, to subsea electromagnetic ("EM") telemetry systems used provide bi-directional communication between the surface control and bottom hole assembly during drilling operations.

BACKGROUND

In conventional bi-directional EM telemetry systems, the transmitter (or receiver) consists of a voltage applied (or measured) across a gap sub in the bottom hole assembly ("BHA"). The receiver (or transmitters) measures (or applies) a voltage received between the drillstring assembly and a surface-deployed counter electrode. This surface-deployed counter electrode is either a metal stake, metal plate, or a porous pot, that electrically couples to the earth. While EM telemetry has been widely operated in onshore drilling, EM telemetry has had very limited success in offshore drilling.

The proliferation of measured-while drilling and logging-while drilling ("M/LWD") services, especially in offshore drilling with higher rig rates, has placed severe strain on the underlying telemetry "backbone", and increasing demand will not diminish in future. M/LWD tools and directional drilling now acquire large data volumes, which must be telemetered back to surface. Often there is a significant difference between "real-time mode" and "memory mode" data due to the telemetry bottleneck. For example, mud pulse telemetry operates with physical data rates only to 30 bits per second (bps). Improvements to telemetry data rates enable faster drilling, and M/LWD data allow proactive well placement to maximize well productivity.

EM telemetry systems typically operate at frequencies between 1 and 15 Hz, with physical data rates nominally between 3 and 12 bps from a limited number of communication channels. EM telemetry is advantageous over mud pulse telemetry, since EM telemetry can be operated continuously during all drilling activities (e.g., during drill pipe connections), and can operate with any mud type or borehole pressure (e.g., underbalanced wells). As previously mentioned, conventional onshore EM telemetry system receives (transmits) a voltage between the well head and a counter electrode from a BHA transmitter (receiver). An offshore EM telemetry system can be configured in a similar manner, whereby the counter electrode is electrically connected to the subsea infrastructure (e.g., risers, BOP) about the well head or rig floor. However, the historic limitation of offshore EM telemetry has been the difficulty of deploying the counter electrode; whether from the rig floor, or from the subsea infrastructure.

The difficulty with EM telemetry in an offshore environment is several-fold. First, the highly variable water depth (from 10's of m in lagoons/transition zones, to 100's of m in shallow water, to 1000's of m in deepwater) impacts the ability to deploy hardwires from the surface unit, through the water column, and to seabed receiving antenna. Second, significant subsea infrastructure (BOP, Christmas tree, riser, subsea processing facilities, pipelines) precludes direct access to the wellhead, or placement of cables and counter electrode. Lastly, for reasons of EM compatibility, various subsea standards (e.g., Intelligent Well Interface Standard) may limit the power, voltage or current that can be applied in the proximity of well and subsea infrastructure.

DESCRIPTION OF ILLUSTRATIVE EMBODIMENTS

Illustrative embodiments and related methods of the present disclosure are described below as they might be employed in offshore electromagnetic telemetry useful during drilling operations. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative embodiments and methods of the present disclosure are directed to offshore M/LWD EM telemetry. In a generalized embodiment, an offshore EM telemetry system includes a drilling platform positioned at a sea surface. A drillstring extends from the drilling platform and through a riser. A BHA having a telemetry transmitter is disposed on the drillstring. A subsea telemetry cable including a number of electrodes is positioned on a sea floor. The telemetry transmitter is operable to transmit signals to the subsea telemetry cable on the sea floor. The subsea telemetry cable is coupled to an umbilical cable extending to a surface communication unit positioned at the sea surface. Therefore, once the signals are received by the subsea telemetry cable (from the telemetry transmitter on the bottomhole assembly), the received signals are transmitted to the communication unit at the surface where they may be processed. Accordingly, embodiments of the present disclosure overcome the practical limitations encountered with conventional offshore EM systems.

Figure 1:
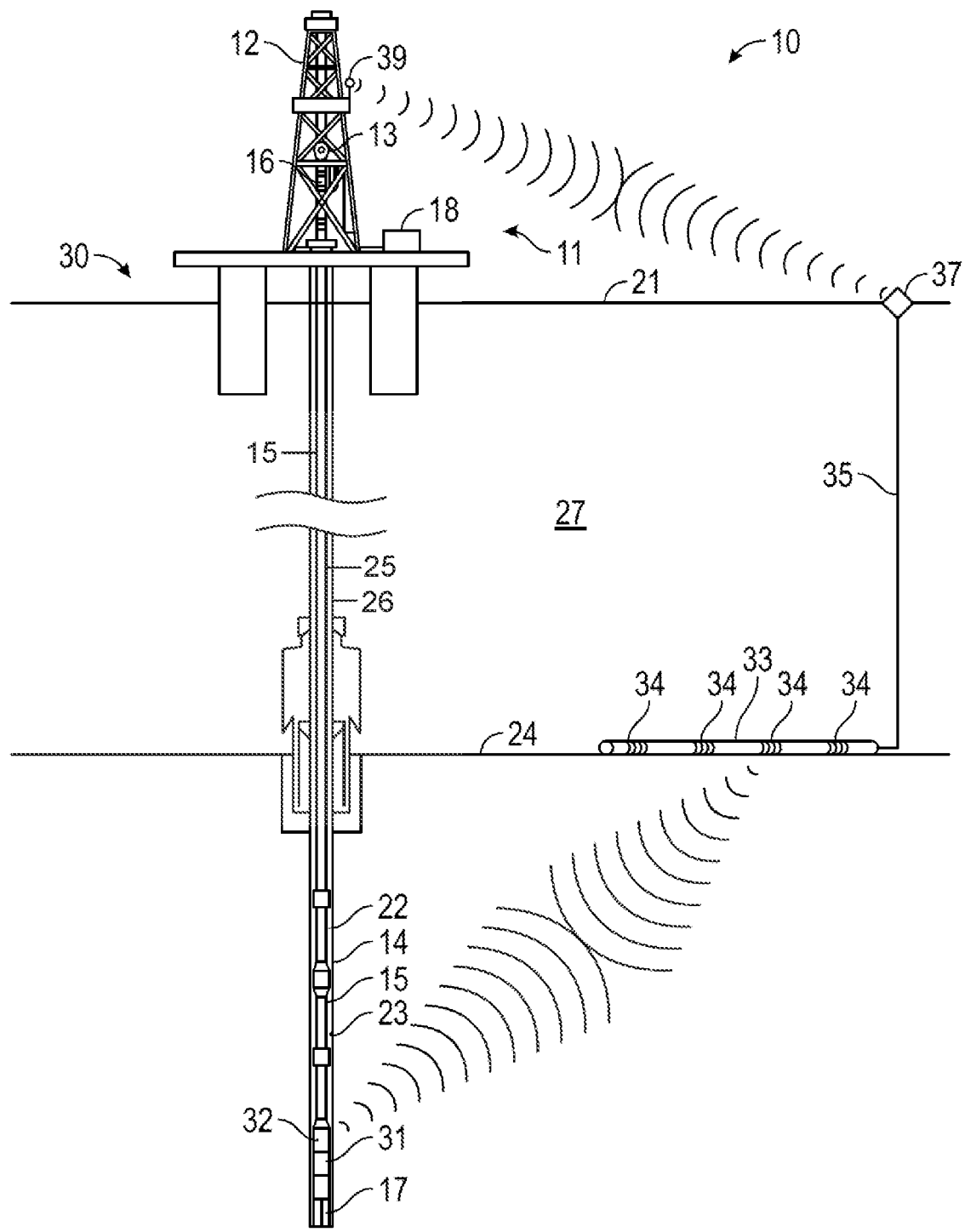
FIG. 1 is a schematic view of an offshore drilling system that employs an offshore M/LWD telemetry system, according to certain illustrative embodiments of the present disclosure.

FIG. 1 is a schematic view of an offshore drilling system 10 that employs an offshore L/MWD telemetry system 30, according to certain illustrative embodiments of the present disclosure. Drilling system 10 comprises an offshore drilling platform 11 (may also be drill ship) equipped with a derrick 12 that supports a hoist 13. Drilling of oil and gas wells is carried out by a string of drill pipes connected together by "tool" joints 14 so as to form a drill string 15 extending subsea from platform 11. The hoist 13 suspends a kelly 16 used to lower the drillstring 15. Connected to the lower end of the drill string 15 is a drill bit 17. The bit 17 is rotated by rotating the drillstring 15 and/or a downhole motor (e.g., downhole mud motor). Drilling fluid, also referred to as drilling "mud", is pumped by mud recirculation equipment 18 (e.g., mud pumps, shakers, etc.) disposed on platform 11. The drilling mud is pumped at a relatively high pressure and volume through drilling kelly 16, and down the drillstring 15 to the drill bit 17. The drilling mud exits drill bit 17 through nozzles or jets in face of drill bit 17. The mud then returns to platform 11 at sea surface 21 via an annulus 22 between drillstring 15 and borehole 23, through a blowout preventer ("BOP") 19 at sea floor 24, and up an annulus 25 between drillstring 15 and riser 26 extending through the sea 27 from blowout preventer 19 to platform 11. At the sea surface 21, the drilling mud is cleaned and then recirculated by the recirculation equipment 18. The drilling mud is used to cool drill bit 17, to carry cuttings from the base of the borehole to platform 11, and to balance the hydrostatic pressure in the rock formations.

In those wells employing telemetry for MWD, telemetry system 30 includes downhole sensors 31 coupled to a transmitter 32 that transmits telemetry signals directly from the BHA to a subsea telemetry cable 33 positioned at sea floor 24. As will be discussed in more detail below, subsea telemetry cable 33 includes a plurality of electrodes 34 positioned therein. As a transmitter or receiver, the signal level of electrodes 34 is enhanced by having larger spacing between the electrodes 34. In different embodiments, the spacing between electrodes may be, for example, as short as 1 m, or up to 1 km. In certain illustrative embodiments, the frequency of offshore telemetry system 30 may be between 1 Hz and 1 kHz.

An umbilical cable 35 couples subsea telemetry cable 33 to a surface communication unit 37 positioned at sea surface 21. During operation, subsea telemetry cable 33 receives the transmitted telemetry signals from transmitter 32 and then re-transmits the signal to surface communication unit 37 over umbilical cable 35. In certain illustrative embodiments, surface communication unit 37 is a wireless, bi-directional communications link coupled itself to a signal processor 39 positioned at drilling platform 11. Signal processor 39 is a computer whereby the signals are decoded, reconstructed, filtered, and/or cleaned, and used to perform downhole operations.

In certain illustrative embodiments, transmitter 32 is an EM transmitter enabling EM telemetry by incorporating an electrical insulator in drillstring 15. To transmit data, the EM tool uses a generator and waveform modulator to apply a time-varying voltage difference between the portion of drillstring 15 above the insulator and the portion of drillstring 15 below the insulator. The voltage difference between the portion of drillstring 15 above the insulator and the portion of drillstring 15 below the insulator in the BHA transmits current into the wellbore and formation. This formation current flow radiates electromagnetic fields into the formation. The time-varying potential on the drillstring above and below the insulator also radiates electromagnetic fields into the formation.

In certain embodiments, subsea telemetry cable 33 is positioned horizontally upon sea floor 24. Electrodes 34 may be formed into a cable of otherwise electrically non-conductive material. In certain illustrative embodiments, subsea telemetry cable 33 comprises an array of at least two transmitting electrodes 34, along with receiving electrodes 34. In other embodiments, subsea telemetry cable 33 may include an array of at least two receiving electrodes 34, and any number of transmitting electrodes 34. In yet other examples, subsea telemetry cable 33 includes an array of at least two transceiving electrodes 34. Moreover, note that subsea telemetry cable 33 may also be utilized to transmit data to the BHA. In such examples, transmitter 32 may be a transceiver or the BHA may contain a separate receiver. Subsea telemetry cable 33 may be a variety of such cables including, for example, the cables commercially available through MultiField Geophysics AS of Norway.

Electrodes 34 of subsea telemetry cable 33 may take a variety of forms. In certain illustrative embodiments, electrodes 34 may be galvanic electrodes which operate using galvanic coupling between the electrode and the earth. Galvanic electrodes consist of non-metal (e.g., graphite), or metal (e.g., stainless steel, titanium, aluminum, and/or tantalum) or metal-metal salt (e.g., Ag—AgCl) electrodes in contact with the seawater or sea surface. In certain embodiments, receiving electrodes may be active electrodes, which consist of galvanic electrodes in series with a preamplifier circuit, where the preamplifier circuit is as close to the electrode as possible. In preferred embodiments, the electrodes would be formed from corrosion resistant, electrically conductive, low electrode potential material.

In other embodiments, the capacitive antennas, e.g., an insulated wire, may also be preferred for transmission of signals, since the antenna impedance may be reduced to 10 mΩ or less. Also, this impedance characteristic may enable over 1,000 A source for maximum power, or enable downsized sources to maximize operational efficiencies and deployment.

During operation, electrodes 34 of subsea telemetry cable 33 receives one or more signals transmitted from BHA transmitter 32. Once received, a decoder decodes the received signal. The decoder may be disposed in the cable on the seafloor, or may be at surface, e.g., at an attached buoy. Once decoded, the data may be encoded for a different telemetry link to the rig, as discussed below. Otherwise, the received signal is simply relayed for decoding at the rig, as discussed below.

Umbilical cable 35 may also take a variety of forms. In certain illustrative embodiments, umbilical cable 35 is an electrical cable deployed in the umbilical cable to perform bi-directional electrical signal telemetry. In alternative embodiments, umbilical cable 35 is a fiber optical cable deployed within umbilical cable 35 for use in performing bi-directional optical telemetry. It is also understood that the relatively low temperatures of sea floor 24 do not present significant challenges to the deployment of lasers for the optical telemetry. In either embodiment, the material of umbilical cable 35 itself may be carbon-fiber shielded and designed to be near-neutral buoyancy to provide protection and insulation for the electrical, optical, etc. cable therein. Although illustrated in FIG. 1 as being remote from riser 26, in alternate embodiments, umbilical cable 35 may be positioned inside or outside adjacent to riser 26.

Subsea telemetry cable 33 may be powered in a variety of ways. For example, in certain embodiments the power supply may be a generator deployed on sea surface 21 (e.g., drilling platform 11 or surface communications unit 37). Power from the power supply is transmitted from the generator to a transformer in subsea telemetry cable 33 via a high tension ("HT") transmission line inside umbilical cable 35. Alternatively, a stored energy device (e.g., batteries) may be deployed on sea floor 24 adjacent subsea telemetry cable 33 or in a surface vessel (e.g., buoy, drilling platform 11, etc.). In other illustrative embodiments, an energy harvesting device (e.g., solar energy or wave motion energy of a surface vessel) may also be used for a power supply. In yet other embodiments, subsea telemetry cable 33 may be interfaced with the existing subsea power infrastructure, as would be understood by ordinarily skilled artisans reviewing this disclosure.

Surface communication unit 37 may also take a variety of forms. As discussed above, in certain illustrative embodiments, surface communication unit 37 provides a wireless, bi-directional communications link (e.g., radio frequency) coupled to a signal processor 39 positioned at drilling platform 11. The vessel upon which surface communication unit 37 is positioned may be, for example, a ship, boat, or buoy.

Telemetry transmissions from BHA transmitter 32 may include data sent as it is collected ("continuous" or "real-time" data), data stored and transmitted after a delay ("buffered" or "historical" data), or a combination of both. M/LWD data collected during actual drilling may be collected at a relatively high resolution and saved locally in memory (e.g., within transmitter 32). However, because of the limited bandwidth of downhole telemetry systems, real-time data may have to be transmitted at a lower resolution. In at least some embodiments, the data may be saved at a higher resolution as described above, and transmitted to the surface at a later time when the tool is still downhole, but while drilling is not taking place (e.g., when a tool gets stuck or when the hole is being conditioned). The historical data transmission may be at a resolution higher than the resolution normally used for real-time data transmission. Nevertheless, the telemetry data communicated over offshore telemetry system 30 may be real-time or historical data.

The disclosed telemetry system may use a variety of modulation/de-modulation schemes. Such scheme may include, but not be limited to Pulse width modulation ("PWM"); Pulse position modulation ("PPM"); On-Off Keying ("OOK"); Amplitude Modulation ("AM"); Frequency Modulation ("FM"); Single-side-band modulation ("SSB"); Frequency Shift Keying ("FSK"); Phase Shift Keying ("FSK") such as Binary Phase Shift Keying "(BPSK") and M-ary shift keying; Discrete Multi-Tone ("DMT"); and Orthogonal Frequency Division Multiplexing ("OFDM").

Figure 2:
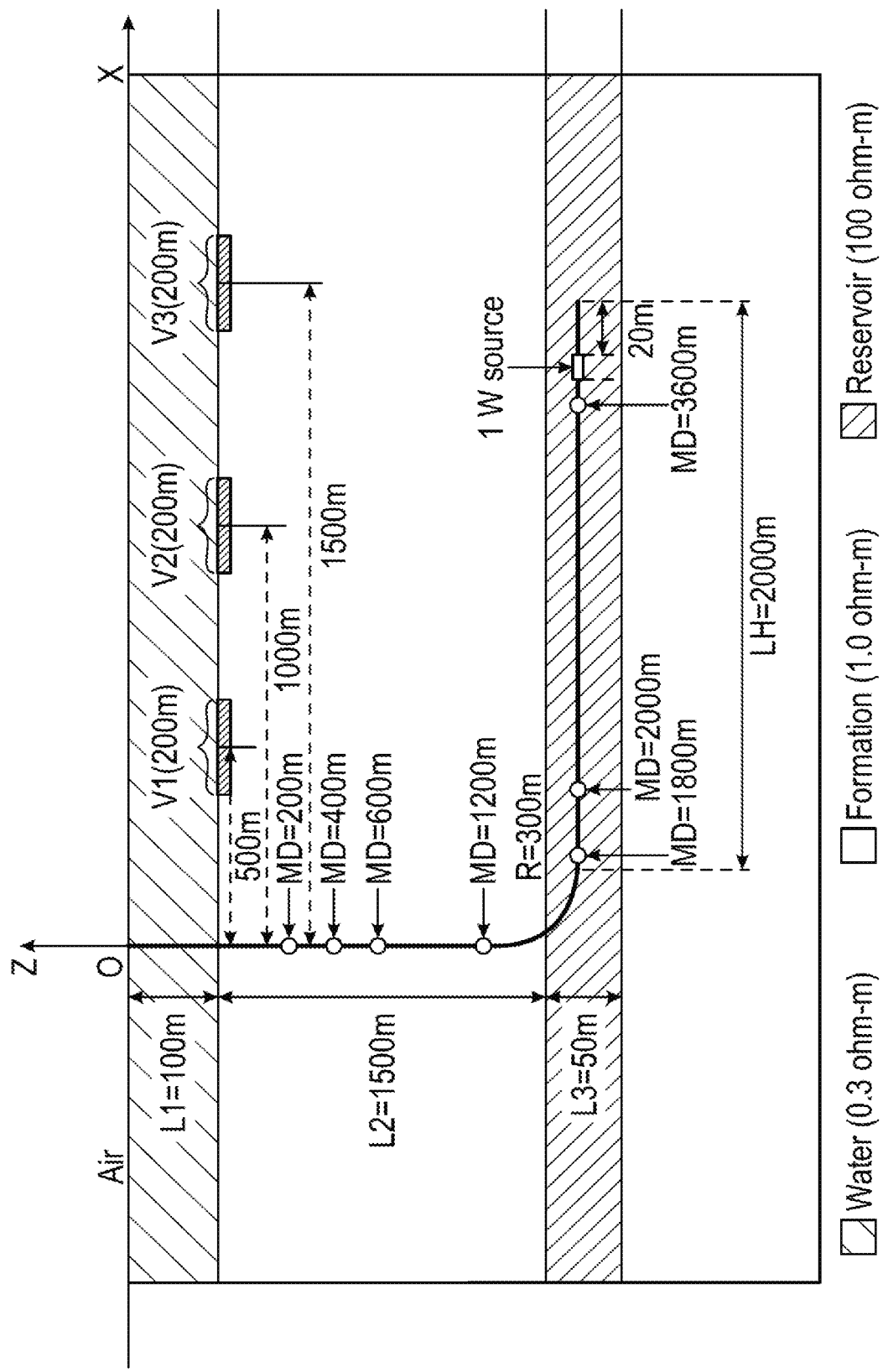
FIG. 2 is an offshore EM telemetry and earth model, according to certain illustrative embodiments of the present disclosure.
Figure 3:
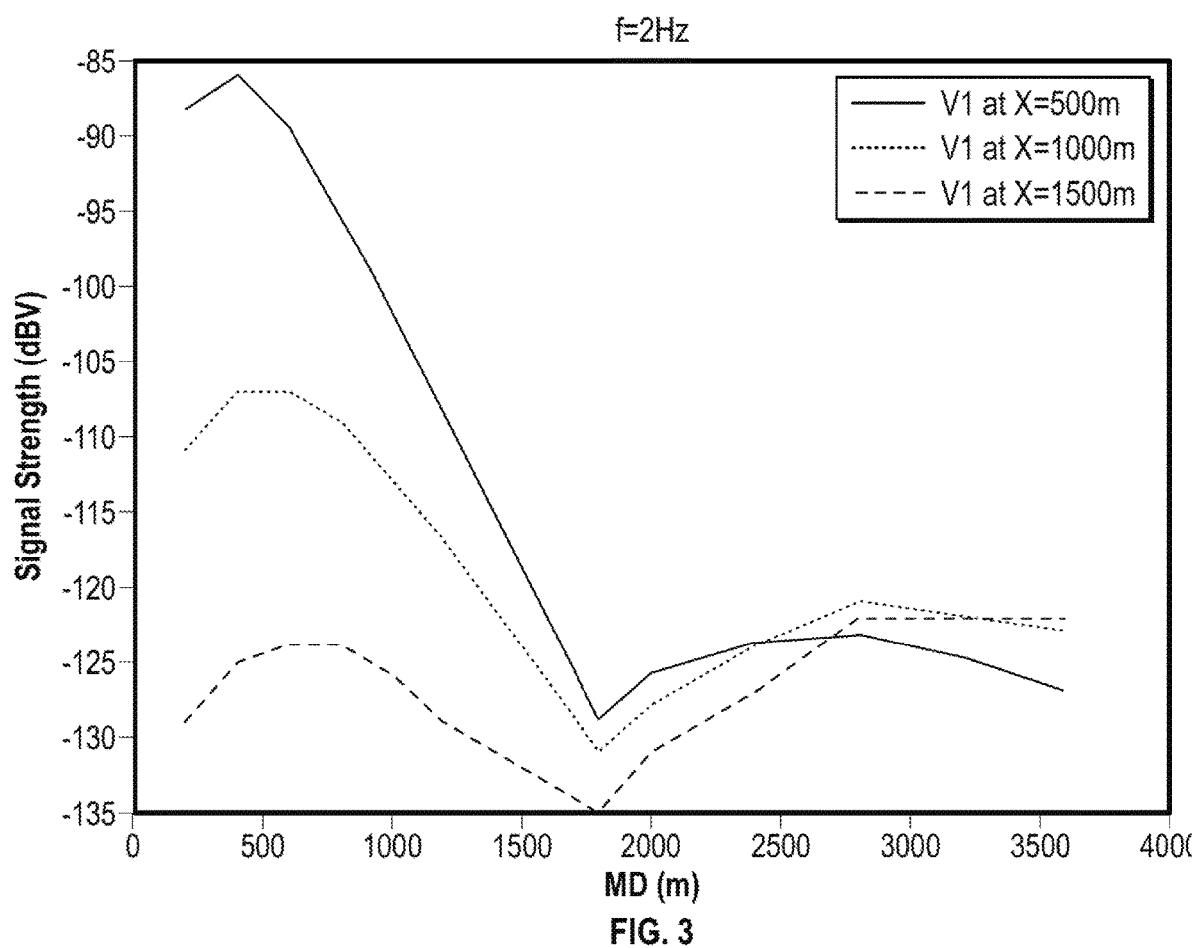
FIG. 3 is a graph showing signal levels recorded for the sea floor cable of FIG. 2, whereby the BHA source was limited to 1 W of power.

FIG. 2 is an offshore EM telemetry and earth model, according to certain illustrative embodiments of the present disclosure. In FIG. 2, the sea floor cable contains electric bipole pairs (identified as V1, V2 and V3) formed by 200 m spaced electrodes at different distances from the wellhead. LH is the length of the lateral section of the well, and R is the radius of the dog leg to redirect the well from vertical to horizontal directions. L1 is the seawater depth, L2 is the depth from seafloor to top of reservoir, and L3 is the reservoir thickness. MD is the measured depth of the BHA along the well trajectory. FIG. 3 is a graph showing signal levels recorded for the sea floor cable of FIG. 2, whereby the BHA source was limited to 1 W of power. As can be seen in FIG. 3, the signal strength at (in dBV) is shown at 2 Hz frequency for sea floor cable receivers, assuming a BHA transmitter power of 1 W. The results will scale if power is increased to typical (or maximum) BHA transmitter power supply levels. V1 is the voltage measured at the electrode pair centered 500 m from the BOP. V2 is the voltage measured at the electrode pair centered 1000 m from the BOP. V3 is the voltage measured at the electrode pair centered 1500 m from the BOP. For optimal telemetry, the highest signal level is preferred. As can be seen, the use of the disclosed subsea telemetry cable enables the highest signal level to be measured for different BHA positions.

The embodiments and related methods described herein provide many advantages. The offshore M/LWD EM telemetry system enables real-time bidirectional EM telemetry between the surface and BHA in offshore drilling. The system can operate in any water depth, from 10's of m, to 1000's of m. There is no requirement for any electrical coupling to the well head, riser, rig, or drill ship. The system has no environmental impact/footprint. The voltage sensing (transmission) may be realized with capacitive coupling of the electrodes to the earth. By eliminating galvanic coupling of the electrodes to the earth, the present disclosure realizes very low electrode-formation contact resistance, minimal electrode degradation, no temperature drift, no electrochemical noise, very short stabilization terms, and have a non-contact design which renders it non-susceptible to changes in local water or geochemistry, or changes in seafloor conditions. The performance of the system matches or exceeds existing state-of-the-art galvanic electrodes. Moreover, the arrays of electrodes can be arranged in any geometry and orientation for maximizing signal to noise ratio ("SNR"). A higher data rate, as compared to mud pulse telemetry, may be realized, thus allowing the present disclosure to serve as a replacement to mud pulse telemetry in offshore drilling.

Figure 4:
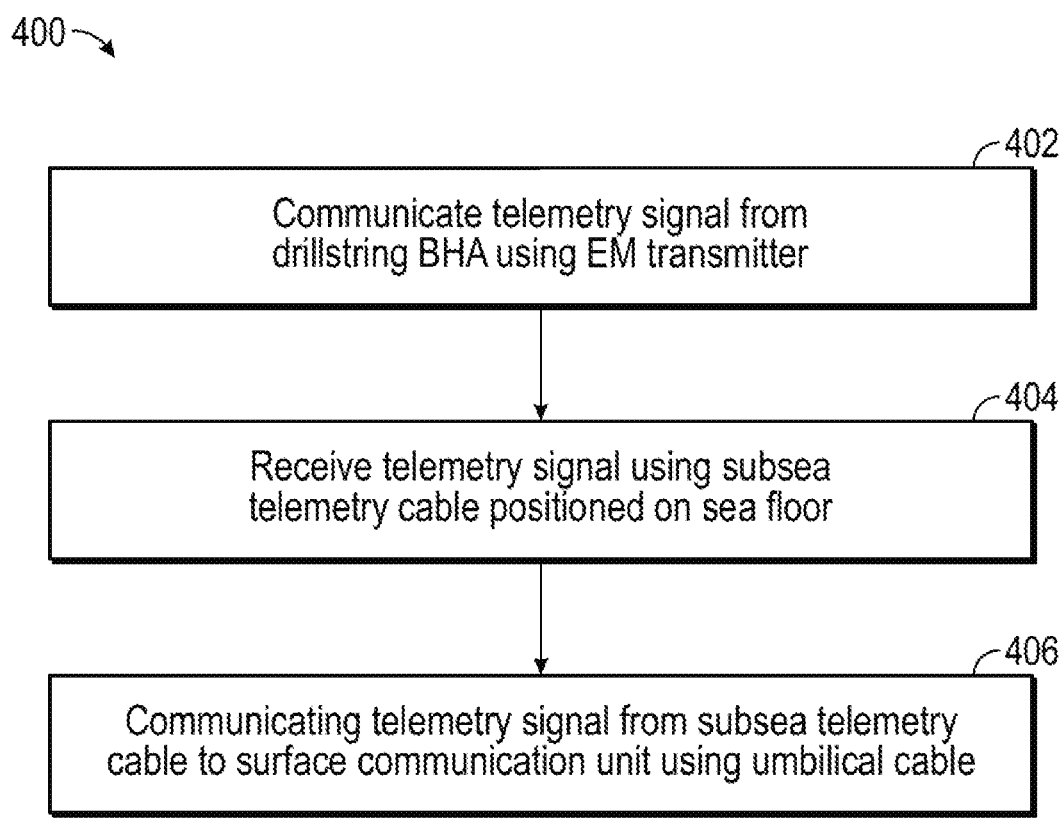
FIG. 4 is a flow chart for communicating data in an EM telemetry system, according to certain illustrative methods of the present disclosure.

FIG. 4 is a flow chart for communicating data in an EM telemetry system, according to certain illustrative methods of the present disclosure. At block 402, an EM telemetry signal is communicated from a drillstring BHA transmitter. At block 404, the EM telemetry signal is received using two or more electrodes of a subsea telemetry cable positioned on the sea floor. At block 406, the received EM telemetry signal is then communicated to a surface communication unit using an umbilical cable coupling the surface communication unit and subsea telemetry signal. Thereafter, the EM telemetry signal may be wirelessly communicated to a signal processor positioned at the drilling platform in order to perform one or more subsea operations (e.g., drilling activities).

Moreover, any of the methods described herein may be processed by on-board or remote processing circuitry that includes at least one processor and a non-transitory and computer-readable storage, all interconnected via a system bus. Software instructions executable by the processing circuitry for implementing the illustrative methods described herein in may be stored in local storage or some other non-transitory computer-readable medium. It will also be recognized that the positioning software instructions may also be loaded into the storage from a CD-ROM or other appropriate storage media via wired or wireless methods.

Moreover, various aspects of the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof in a computer system or other processing system.

Embodiments and methods described herein further relate to any one or more of the following paragraphs:

1. An offshore electromagnetic telemetry system, comprising a drilling platform positioned at a sea surface; a drillstring extending from the drilling platform and through a riser, the drillstring having a lower end including a bottomhole assembly disposed in a subsea borehole; a telemetry transmitter positioned in the bottomhole assembly; a subsea telemetry cable positioned on a sea floor, the subsea telemetry cable having a plurality of electrodes positioned therein, wherein the telemetry transmitter is adapted to transmit a telemetry signal from the bottomhole assembly to the subsea telemetry cable; and an umbilical cable coupling the subsea telemetry cable to a surface communication unit positioned at the sea surface, the umbilical cable being adapted to transmit the telemetry signal from the subsea telemetry cable to the surface communication unit.

2. The telemetry system as defined in paragraph 1, further comprising a wireless, bi-directional communications link coupling the surface communication unit to a signal processor positioned at the drilling platform.

3. The telemetry system as defined in paragraphs 1 or 2, wherein the umbilical cable is positioned remotely from the riser.

4. The telemetry system as defined in any of paragraphs 1-3, wherein the umbilical cable is disposed in the riser.

5. The telemetry system as defined in any of paragraphs 1-4, wherein the umbilical cable comprises a electrical cable or fiber optical cable adapted for bi-directional communication.

6. The telemetry system as defined in any of paragraphs 1-5, wherein the surface communications unit is positioned on a buoy, ship, or boat.

7. A method for communicating data in an electromagnetic telemetry system, the method comprising communicating a telemetry signal from a transmitter of a bottomhole assembly disposed in a subsea borehole, the bottomhole assembly being part of a drillstring extending from a drilling platform positioned at a sea surface and through a riser; receiving the telemetry signal with two or more electrodes of a subsea telemetry cable positioned on a sea floor; using an umbilical cable coupling the subsea telemetry cable to a surface communication unit positioned at the sea surface, communicating the telemetry signal from the subsea telemetry cable to the surface communication unit; and wirelessly communicating the telemetry signal from the surface communication unit to a signal processor positioned at the drilling platform, wherein the telemetry signal may be used to perform one or more subsea operations.

8. The method as defined in paragraph 7, wherein the umbilical cable communicating the telemetry signal from the subsea telemetry cable to the surface communication unit is positioned remotely from the riser.

9. The method as defined in paragraphs 7 or 8, wherein the umbilical cable communicating the telemetry signal from the subsea telemetry cable to the surface communication unit is positioned in the riser.

10. The method as defined in any of paragraphs 7-9, wherein the umbilical cable communicates the telemetry signal over an electrical cable or fiber optical cable adapted for bi-directional communication.

11. The method as defined in any of paragraphs 7-10, wherein the surface communications unit is positioned on a buoy, ship, or boat.

12. A method for communicating data in an electromagnetic telemetry system, the method comprising communicating a telemetry signal from a transmitter of a bottomhole assembly disposed in a subsea borehole, the bottomhole assembly being part of a drillstring extending from a drilling platform positioned at a sea surface and through a riser; receiving the telemetry signal with two or more electrodes of a subsea telemetry cable positioned on a sea floor; and using an umbilical cable coupling the subsea telemetry cable to a surface communication unit positioned at the sea surface, communicating the telemetry signal from the subsea telemetry cable to the surface communication unit.

13. The method as defined in paragraph 12, further comprising wirelessly communicating the telemetry signal from the surface communication unit to a signal processor positioned at the drilling platform.

14. The method as defined in paragraph 12 or 13, wherein the umbilical cable communicating the telemetry signal from the subsea telemetry cable to the surface communication unit is positioned remotely from the riser.

15. The method as defined in any of paragraphs 12-14, wherein the umbilical cable communicating the telemetry signal from the subsea telemetry cable to the surface communication unit is positioned in the riser.

16. The method as defined in any of paragraphs 12-15, wherein the umbilical cable communicates the telemetry signal over an electrical cable or fiber optical cable adapted for bi-directional communication.

17. The method as defined in any of paragraphs 12-16, wherein the surface communications unit is positioned on a buoy, ship, or boat.

18. The method as defined in any of paragraphs 12-17, further comprising performing a subsea operation using the telemetry signal.

Moreover, the methods described herein may be embodied within a system comprising processing circuitry to implement any of the methods, or a in a non-transitory computer-readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. An offshore electromagnetic telemetry system, comprising:
   a drilling platform positioned at a sea surface;
   a drillstring extending from the drilling platform and through a riser, the drillstring having a lower end including a bottomhole assembly disposed in a subsea borehole extending along a formation;
   an electromagnetic telemetry transmitter positioned in the bottomhole assembly; a subsea telemetry cable positioned on a sea floor, the subsea telemetry cable having a plurality of electrodes positioned therein, wherein the telemetry transmitter is adapted to wirelessly transmit a telemetry signal from the bottomhole assembly, through the formation, and to the subsea telemetry cable;

an umbilical cable coupling the subsea telemetry cable to a surface communication unit positioned at the sea surface, the umbilical cable being adapted to transmit the telemetry signal from the subsea telemetry cable to the surface communication unit; and a wireless, bi-directional communications link coupling the surface communication unit to a signal processor positioned at the drilling platform.

2. The telemetry system as defined in claim 1, wherein the umbilical cable is positioned remotely from the riser.

3. The telemetry system as defined in claim 1, wherein the umbilical cable is disposed in the riser.

4. The telemetry system as defined in claim 1, wherein the umbilical cable comprises a electrical cable or a fiber optical cable adapted for bi-directional communication.

5. The telemetry system as defined in claim 1, wherein the surface communications unit is positioned on a buoy, a ship, or a boat.

6. A method for communicating data in an electromagnetic telemetry system, the method comprising:

wirelessly communicating an electromagnetic telemetry signal from a transmitter of a bottomhole assembly disposed in a subsea borehole, the bottomhole assembly being part of a drillstring extending from a drilling platform positioned at a sea surface and through a riser;

wirelessly receiving the telemetry signal with two or more electrodes of a subsea telemetry cable positioned on a sea floor;

using an umbilical cable coupling the subsea telemetry cable to a surface communication unit positioned at the sea surface, communicating the telemetry signal from the subsea telemetry cable to the surface communication unit; and wirelessly communicating the telemetry signal from the surface communication unit to a signal processor positioned at the drilling platform, wherein the telemetry signal may be used to perform one or more subsea operations.

7. The method as defined in claim 6, wherein the umbilical cable communicating the telemetry signal from the subsea telemetry cable to the surface communication unit is positioned remotely from the riser.

8. The method as defined in claim 6, wherein the umbilical cable communicating the telemetry signal from the subsea telemetry cable to the surface communication unit is positioned in the riser.

9. The method as defined in claim 6, wherein the umbilical cable communicates the telemetry signal over an electrical cable or a fiber optical cable adapted for bi-directional communication.

10. The method as defined in claim 6, wherein the surface communications unit is positioned on a buoy, a ship, or a boat.

11. A method for communicating data in an electromagnetic telemetry system, the method comprising:

wirelessly communicating an electromagnetic telemetry signal from a transmitter of a bottomhole assembly disposed in a subsea borehole, the bottomhole assembly being part of a drillstring extending from a drilling platform positioned at a sea surface and through a riser;

wirelessly receiving the telemetry signal with two or more electrodes of a subsea telemetry cable positioned on a sea floor;

using an umbilical cable coupling the subsea telemetry cable to a surface communication unit positioned at the sea surface, communicating the telemetry signal from the subsea telemetry cable to the surface communication unit; and wirelessly communicating the telemetry signal from the surface communication unit to a signal processor positioned at the drilling platform.

12. The method as defined in claim 11, wherein the umbilical cable communicating the telemetry signal from the subsea telemetry cable to the surface communication unit is positioned remotely from the riser.

13. The method as defined in claim 11, wherein the umbilical cable communicating the telemetry signal from the subsea telemetry cable to the surface communication unit is positioned in the riser.

14. The method as defined in claim 11, wherein the umbilical cable communicates the telemetry signal over an electrical cable or a fiber optical cable adapted for bi-directional communication.

15. The method as defined in claim 11, wherein the surface communications unit is positioned on a buoy, a ship, or a boat.

16. The method as defined in claim 11, further comprising performing a subsea operation using the telemetry signal.

* * * * *